(12) United States Patent
Willburger et al.

(10) Patent No.: US 11,486,489 B2
(45) Date of Patent: Nov. 1, 2022

(54) DRIVE TRAIN UNIT AND DRIVE TRAIN FOR A MOTOR VEHICLE

(71) Applicant: ZF Friedrichshafen AG, Friedrichshafen (DE)

(72) Inventors: Andre Willburger, Grünkraut (DE); Oliver Angele, Weingarten (DE); Angelika Ebert, Schonungen (DE); Monika Rößner, Donnersdorf (DE); Christian Staiger, Immenstaad (DE); Eberhard Biermann, Ravensburg (DE); Markus Herrmann, Scheidegg (DE); Tobias Miller, Waldburg (DE); Florian Lanz, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 230 days.

(21) Appl. No.: 17/018,385

(22) Filed: Sep. 11, 2020

(65) Prior Publication Data
US 2021/0079997 A1  Mar. 18, 2021

(30) Foreign Application Priority Data

Sep. 13, 2019  (DE) .................... 10 2019 214 001.7

(51) Int. Cl.
*F16H 57/04*  (2010.01)
*F16H 57/021*  (2012.01)
*F16H 57/031*  (2012.01)

(52) U.S. Cl.
CPC ....... *F16H 57/0471* (2013.01); *F16H 57/021* (2013.01); *F16H 57/031* (2013.01); *F16H 57/043* (2013.01); *F16H 57/0473* (2013.01)

(58) Field of Classification Search
CPC .. F16H 57/0471; F16H 57/021; F16H 57/031; F16H 57/043; F16H 57/0473
See application file for complete search history.

(56) References Cited

U.S. PATENT DOCUMENTS 1,186,279 A * 6/1916 Carpenter ................. F16N 7/30
184/50.1
5,139,349 A * 8/1992 Nakano ................. F16C 33/103
384/322

(Continued)

FOREIGN PATENT DOCUMENTS

DE       10332210 A1    2/2005
DE    102013219326 A1    3/2015
DE    102018205471 A1   10/2019

OTHER PUBLICATIONS

German Search Report DE102019214001.7, dated Apr. 16, 2020. (10 pages).

*Primary Examiner* — Colby M Hansen
(74) *Attorney, Agent, or Firm* — Dority & Manning, P.A.

(57) ABSTRACT

A drive train unit (HY, G) for a motor vehicle includes a first shaft (TW), a second shaft (PW), and a third shaft (AN). The first shaft (TW) is rotatably mounted at an inner diameter of the second shaft (PW) with a first bearing (L1). The second shaft (PW) is rotatably mounted at an inner diameter of the third shaft (AN) with a second bearing (L2, L2x). A lube oil feed to the first bearing (L1) and the second bearing (L2, L2x) takes place through a bore hole (B1) arranged in the first shaft (TW). An oil baffle chamber (S) is formed at an inner surface of the second shaft (PW) and includes a first outflow (S1) and a second outflow (S2). A drive train for a motor vehicle may include such a drive train unit (HY, G).

11 Claims, 6 Drawing Sheets

(56) References Cited

U.S. PATENT DOCUMENTS

| | | | |
|---|---|---|---|
| 7,021,169 B2 | 4/2006 | Kobayashi | |
| 7,437,964 B2 | 10/2008 | Gitt | |
| 2006/0166778 A1 | 7/2006 | Tabata et al. | |
| 2008/0300095 A1 | 12/2008 | Doi et al. | |
| 2019/0178363 A1* | 6/2019 | Antes | B23K 37/047 |

* cited by examiner

DRIVE TRAIN UNIT AND DRIVE TRAIN FOR A MOTOR VEHICLE

CROSS-REFERENCE TO RELATED APPLICATION

The present application is related and has right of priority to German Patent Application No. 10 2019 214 001.7 filed on Sep. 13, 2019, which is incorporated by reference in its entirety for all purposes.

FIELD OF THE INVENTION

The invention relates generally to a drive train unit for a motor vehicle, and to a drive train for a motor vehicle including such a drive train unit.

BACKGROUND

A drive train unit can be formed, for example, by a transmission, which is configured for forming different ratios between an internal combustion engine and driving wheels of the motor vehicle. Alternatively, the drive train unit can be designed as a separate component, which is arranged in the drive train between the internal combustion engine and the transmission. A component of this type is also referred to as a hybrid module.

Patent application DE 10 2018 205 471.1, which is still unpublished, describes the mounting in a hybrid module for a motor vehicle. This hybrid module includes a damper hub, a housing, an electric machine, a torque converter including a central hub, and an output shaft. The central hub is supported against the output shaft via a bearing and is supported against the damper hub via two further bearings. The damper hub itself is supported against the housing via an additional bearing. The lube oil feed to the bearings is not disclosed, however.

DE 10 2013 219 326 A1 describes a transmission including a multi-disk clutch, in particular, an oil guidance arrangement including two different oil flows to antifriction bearings and to the multi-disk clutch of the transmission. An oil baffle chamber is arranged in one of the oil flows. Due to the oil baffle chamber, this oil flow is distributed between an oil feed to a compensating cavity of the multi-disk clutch and an oil feed to a torsional vibration damper.

SUMMARY OF THE INVENTION

Example aspects of the invention provide a suitable lube oil feed to bearings of a drive train unit.

In example embodiments, a drive train unit for a motor vehicle is provided, which includes a first shaft, a second shaft, and a third shaft. These three shafts are rotatably mounted with respect to a housing of the drive train unit. The first shaft is rotatably mounted, at least with the aid of a first bearing, at an inner diameter of the second shaft. The second shaft is rotatably mounted, at least with the aid of a second bearing, at an inner diameter of the third shaft. A lube oil feed to the first and second bearings takes place starting from a bore hole arranged in the first shaft.

An oil baffle chamber including a first outflow and a second outflow is formed at an inner surface of the second shaft. The two outflows are arranged in such a way that, starting from the first outflow, a first oil flow results in the direction of the first bearing and, starting from the second outflow, a second oil flow results in the direction of the second bearing. In this way, a reliable lube oil feed to the first bearing as well as to the second bearing can be ensured in a simple way.

Preferably, the drive train unit includes a hydraulically actuated multi-disk clutch. The first oil flow is provided not only as the lube oil feed to the first bearing, but also for feeding oil to a pressure compensating cavity of the multi-disk clutch. As a result, a separate supply line to the pressure compensating cavity can be omitted. The multi-disk clutch is preferably intended for providing an engageable connection between the third shaft and the second shaft.

According to one preferred example embodiment, an extension is arranged at an axial end of the first shaft. This extension is designed in such a way that lube oil emerging from the bore hole arranged in the first shaft is guided along an inner surface of the extension to the oil baffle chamber. Due to an approach of this type, a reliable filling of the oil baffle chamber can also be ensured in the case of confined space conditions between the first shaft and the second shaft. One axial end of the extension is preferably axially arranged between the first outflow and the second outflow of the oil baffle chamber.

According to one possible example embodiment, the first bearing is arranged at an outer circumference of the extension. As a result, a diameter of the first bearing can be reduced, and so the circumferential speed of the first bearing is reduced.

According to one possible example embodiment, a covering element including at least one passage opening is provided at one axial end of the second shaft. A flow rate of the second oil flow can be limited depending on the opening cross-section of the at least one passage opening of the covering element.

Preferably, the drive train unit includes a hydrodynamic torque converter with an impeller and a turbine wheel. The first shaft is connected to the turbine wheel and the second shaft is connected to the impeller.

The drive train unit can be an integral part of a drive train for a motor vehicle.

BRIEF DESCRIPTION OF THE DRAWINGS

Exemplary embodiments of the invention are described in detail in the following. Wherein.

DETAILED DESCRIPTION

Figure 1:
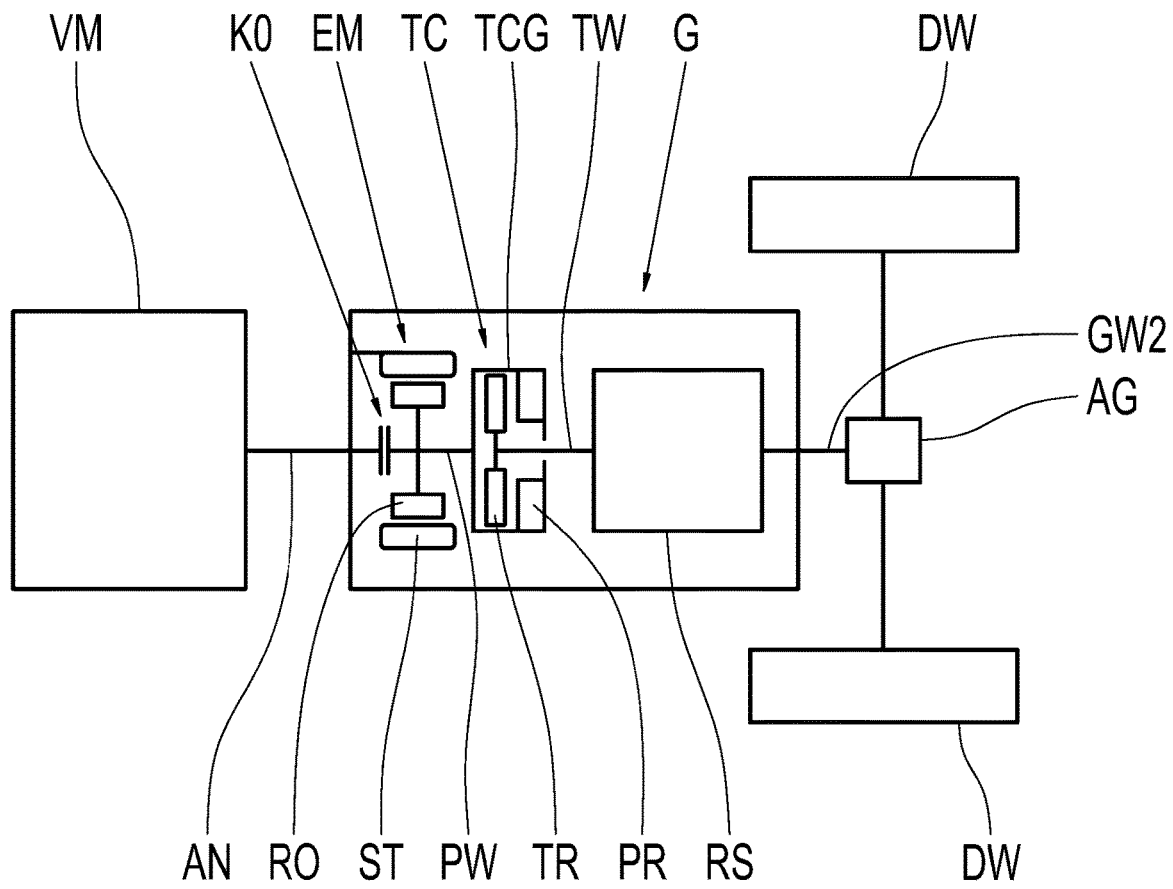
FIG. 1 and FIG. 2 each diagrammatically show a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 diagrammatically shows a drive train for a motor vehicle. The drive train includes an internal combustion engine VM, the output of which is connected to a connection shaft AN of a transmission G. The transmission G forms a drive train unit of the drive train, and includes an electric machine EM with a rotationally fixed stator ST and a rotary rotor RO, as well as a torque converter TC. The torque converter TC includes an impeller PR and a turbine wheel TR, which cooperate hydrodynamically in a known way. The torque converter TC preferably also includes a stator as well as a torque converter lockup clutch, which are not represented in FIG. 1, however. The rotor RO is connected to a housing TCG of a torque converter TC via a shaft PW. The impeller PR is connected to the housing TCG. The shaft PW is connectable to the connection shaft AN via a clutch K0. The clutch K0 is designed as a hydraulically actuated multi-disk clutch. On the output end, the torque converter TC is connected to an input shaft TW of a transmission gear set RS. An output shaft GW2 of the transmission gear set RS is connected to driving wheels DW of the motor vehicle via a differential gear AG.

Figure 2:
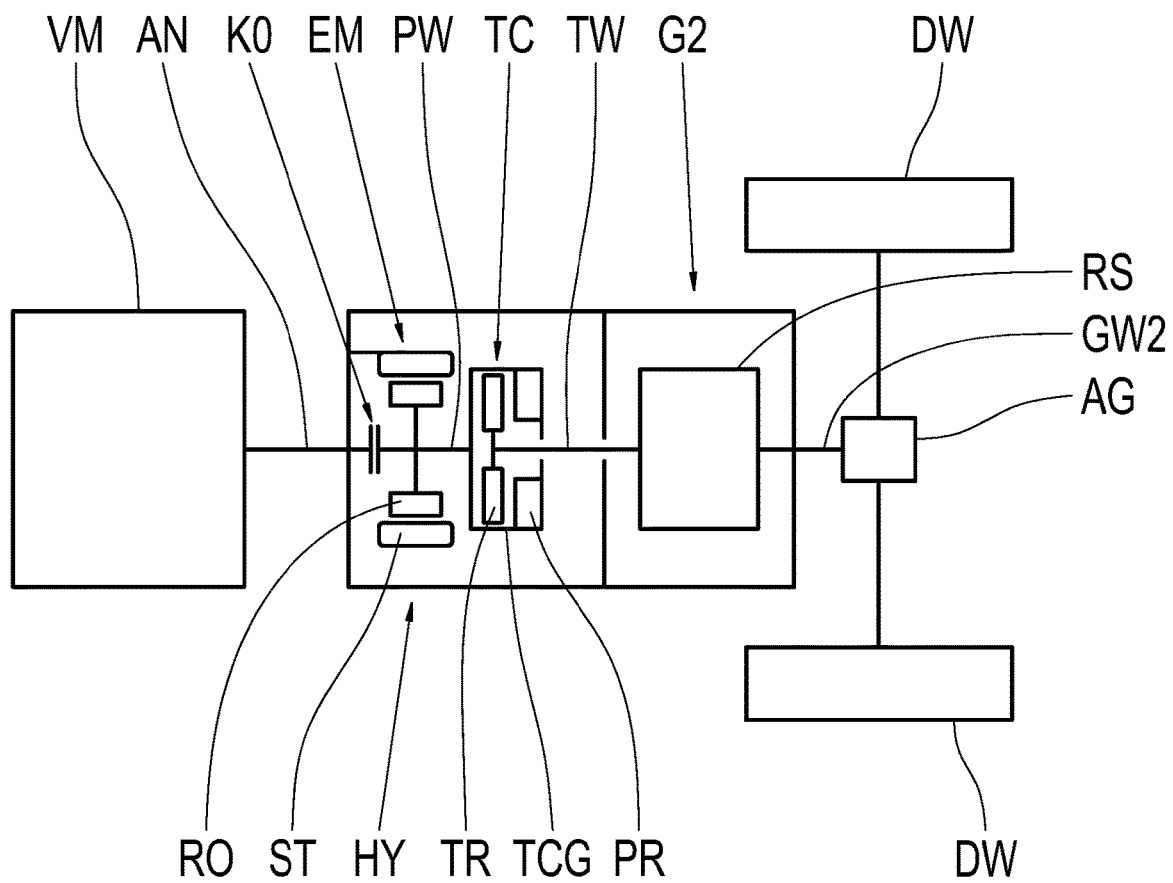

FIG. 2 diagrammatically shows a drive train, in which no electric machine is contained in a transmission G2. Instead, a hybrid module HY is provided between the internal combustion engine VM and the transmission G2. In this example embodiment, the hybrid module HY includes the electric machine EM, and so the hybrid module HY forms a separate drive train unit of the drive train. In the exemplary embodiment represented in FIG. 2, the torque converter TC is also an integral part of the hybrid module HY. Alternatively, the torque converter TC could be an integral part of the transmission G2.

Various exemplary embodiments of a drive train unit are described in FIG. 3 through 6, which are described in the following. This can be a transmission G per the example according to FIG. 1 or a hybrid module HY per the example according to FIG. 2. In FIG. 3 through FIG. 6, partial sections of the connection shaft AN, the shaft PW, and the input shaft TW, as well as mounting of such components, are represented. In the corresponding description of these figures, the input shaft TW is referred to as the first shaft, the shaft PW is referred to as the second shaft, and the connection shaft AN is referred to as the third shaft.

Figure 3:
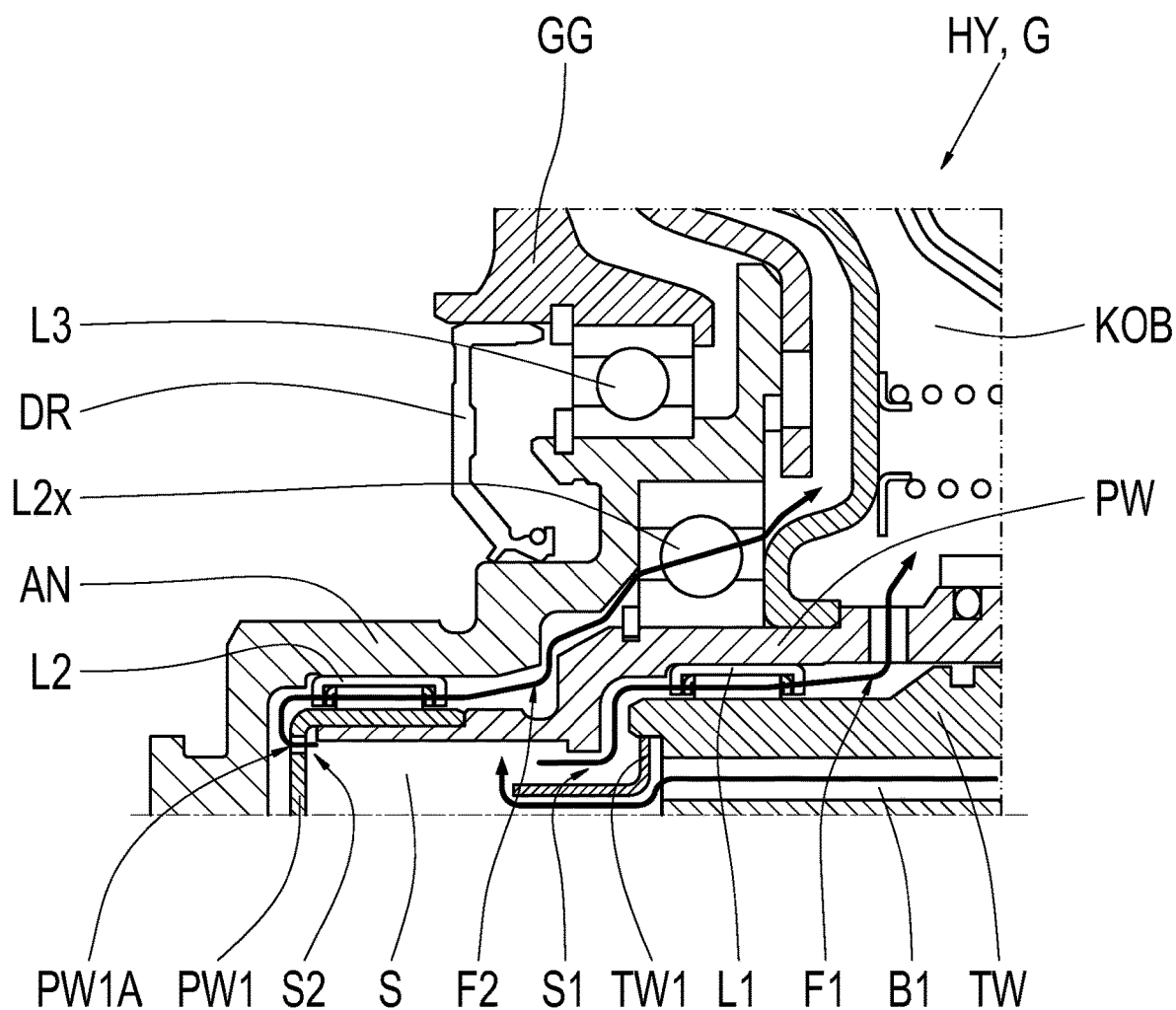
FIG. 3 through FIG. 6 each show a partial section view of the drive train unit of the drive train according to different example embodiments.

FIG. 3 shows a partial section view of the drive train unit HY, G according to a first exemplary embodiment. The first shaft TW is rotatably mounted, with the aid of a first bearing L1, at an inner diameter of the second shaft PW. The first bearing L1 is designed as a needle bearing. The second shaft PW is rotatably mounted, with the aid of a second bearing L2, at an inner diameter of the third shaft AN. The second bearing L2 is also designed as a needle bearing. In addition, the second shaft PW is mounted via an additional bearing L2x at the third shaft AN, wherein the additional bearing L2x is designed as a single-row ball bearing. The third shaft AN is rotatably mounted via a bearing L3, in a rotary manner, at a housing GG. The bearing L3 is designed as a single-row ball bearing. The housing GG can be designed to be multiple-part, wherein the section of the housing GG represented in FIG. 3 is a bearing shield of the housing GG. Moreover, a shaft sealing ring DR is arranged between the housing GG and the third shaft AN.

An axially extending bore hole B1 is arranged in the first shaft TW, in order to feed lube oil to the first bearing L1 and to the second bearing L2. A sleeve-shaped extension TW1 is attached at the axial end of the first shaft TW. The lube oil emerging from the bore hole B1 collects at an inner surface of the extension TW1 due to the rotational speed of the first shaft TW. At the axial end of the extension TW1, the oil emerges radially outward due to the rotational speed of the first shaft TW and impacts an inner surface of the second shaft PW. This area of the inner surface of the second shaft PW forms an oil baffle chamber S. Due to the rotational speed of the second shaft PW, the oil collects in the oil baffle chamber S. The oil baffle chamber S includes two outflows, which are marked as S1 and S2. If the oil baffle chamber S is sufficiently filled with oil, oil emerges from the oil baffle chamber S over an edge at the first outflow S1 in the direction of the first bearing L1. The particular oil flow is marked as F1. After flowing through the first bearing L1, the first oil flow F1 continues through a radial bore hole in the second shaft PW to a pressure compensating cavity K0B of the multi-disk clutch K0.

The second outflow S2 out of the oil baffle chamber S is arranged at the axial end of the second shaft PW. A covering element PW1 is arranged at this axial end of the second shaft PW. At least one passage opening PW1A, preferably multiple passage openings PW1A distributed at the circumference, is/are provided in the covering element PW1. If the oil baffle chamber S is sufficiently filled with oil, oil emerges from the oil baffle chamber S over an edge at the at least one passage opening PW1A at the second outflow S2 in the direction of the second bearing L2. The particular oil flow is marked as F2. After flowing through the second bearing L2, the second oil flow F2 continues to the additional bearing L2x, and so the bearing L2x is lubricated.

Figure 4:
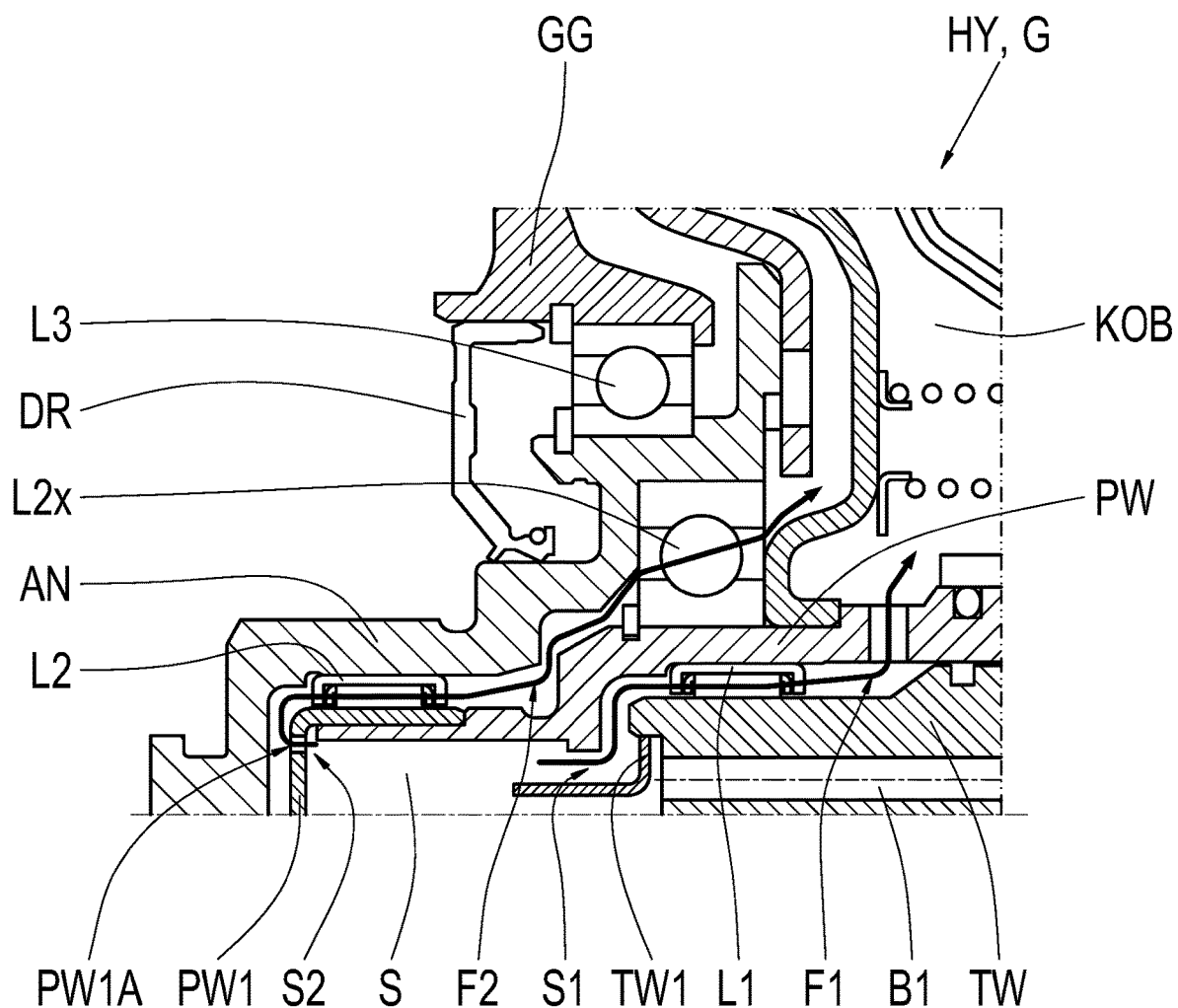

FIG. 4 shows a partial section view of the drive train unit HY, G according to a second exemplary embodiment, which essentially corresponds to the first exemplary embodiment represented in FIG. 3. The only difference between the first and the second exemplary embodiments is that the inner surface at the second shaft PW in the area of the oil baffle chamber S is designed to be inclined in this case, and so a separate machining of the edge at the first outflow S1 is omitted. For the rest, reference is made to the comments presented with respect to FIG. 3.

Figure 5:
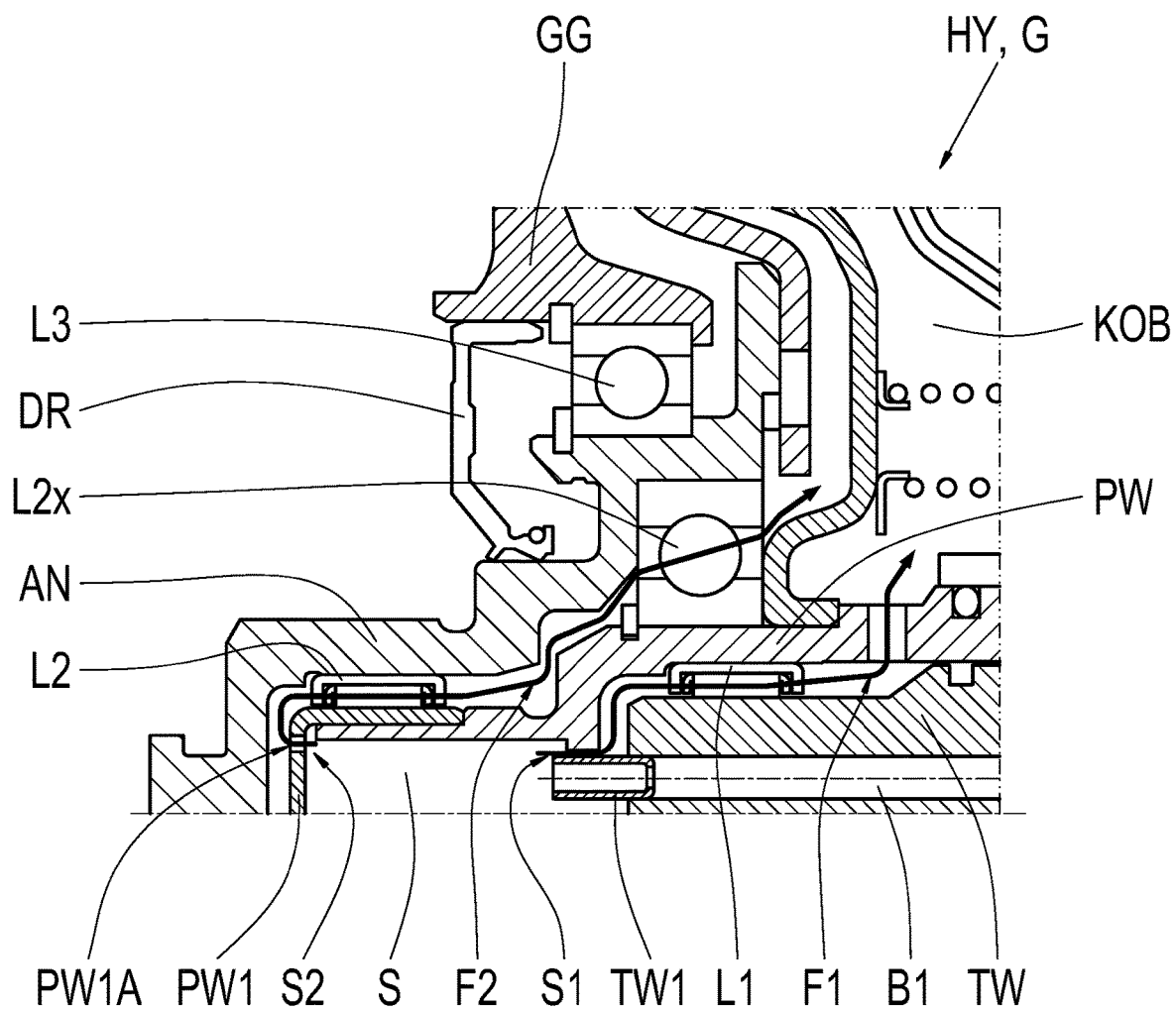

FIG. 5 shows a partial section view of the drive train unit HY, G according to a third exemplary embodiment, which essentially corresponds to the first exemplary embodiment represented in FIG. 3. The only difference between the first and the third exemplary embodiments is the design of the extension TW1, which, in FIG. 5, is designed as a pipe inserted into the bore hole B1. For the rest, reference is made to the comments presented with respect to FIG. 3.

Figure 6:
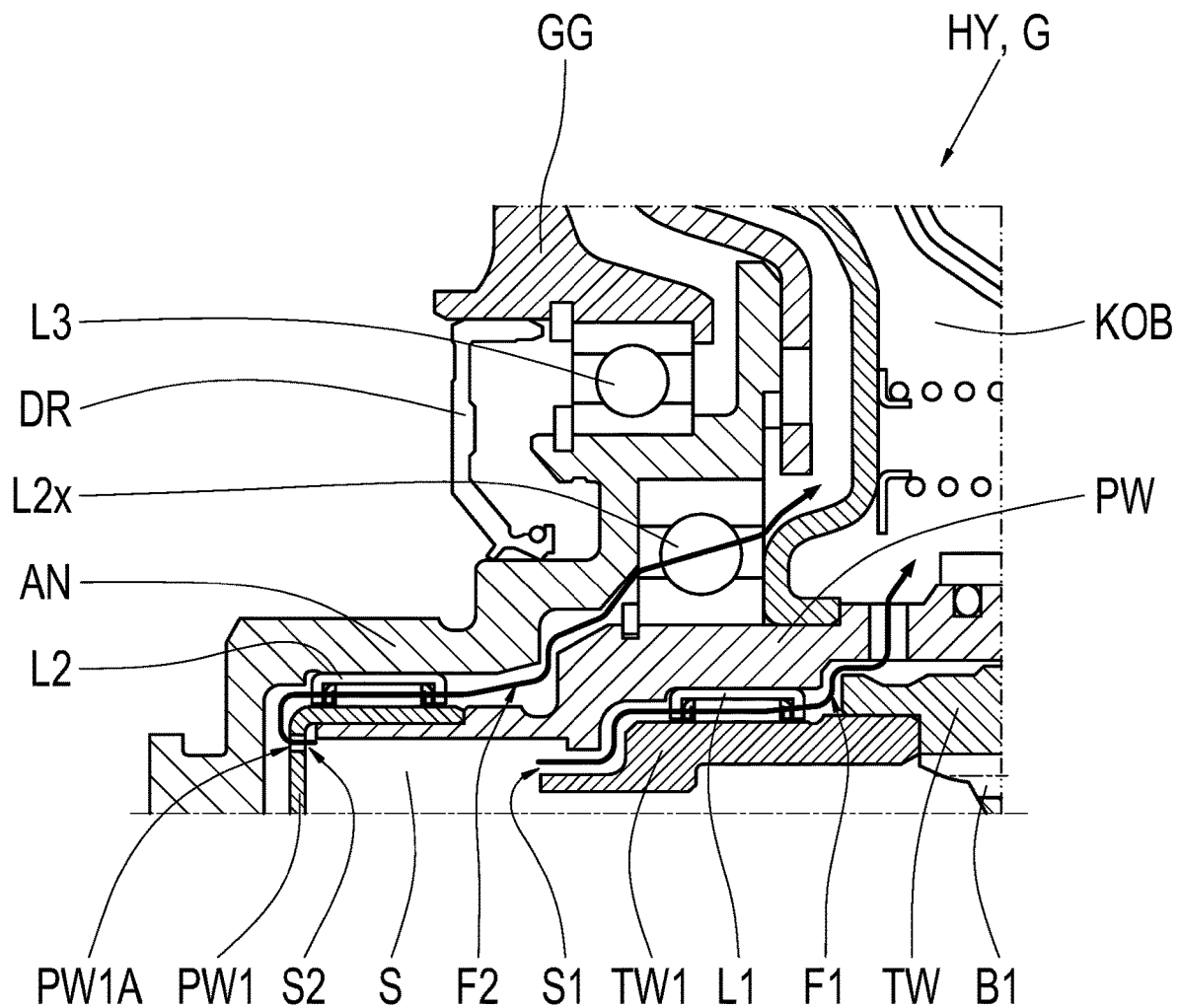

FIG. 6 shows a partial section view of the drive train unit HY, G according to a fourth exemplary embodiment, which essentially corresponds to the first exemplary embodiment represented in FIG. 3. Therein, the first shaft TW has a two-piece design, and so the extension TW1 forms a structural part of the first shaft TW. The first bearing L1 is arranged at an outer circumference of the extension TW1. Due to an example embodiment of this type, a diameter of the first bearing L1 can be reduced with respect to the preceding exemplary embodiments.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

VM internal combustion engine
HY hybrid module

G, G2 transmission
AG differential gear
DW driving wheel
EM electric machine
ST stator
RO rotor
GG housing
TC torque converter
PR impeller
TR turbine wheel
TCG torque converter housing
K0 multi-disk clutch
K0B pressure compensating cavity
RS transmission gear set
TW input shaft; first shaft
TW1 extension
B1 bore hole
GW2 output shaft
PW shaft; second shaft
AN connection shaft; third shaft
L1 first bearing
L2 second bearing
L2x additional bearing
L3 bearing
DR shaft sealing ring
S oil baffle chamber
S1 first outflow
S2 second outflow
F1 first oil flow
F2 second oil flow
PW1 covering element
PW1A passage opening

The invention claimed is:

1. A drive train unit (HY, G) for a motor vehicle, comprising:
   a housing (GG);
   a first shaft (TW), a second shaft (PW), and a third shaft (AN), the first, second, and third shafts (TW, PW, A) rotatably mounted relative to the housing (GG);
   a first bearing (L1) and a second bearing (L2, L2x), the first shaft (TW) rotatably mounted at an inner diameter of the second shaft (PW) at least with the first bearing (L1), the second shaft (PW) rotatably mounted at an inner diameter of the third shaft (AN) at least with the second bearing (L2, L2x),
   wherein a lube oil feed to the first bearing (L1) and the second bearing (L2, L2x) takes place through a bore hole (B1) arranged in the first shaft (TW), and
   wherein an oil baffle chamber (S) is formed at an inner surface of the second shaft (PW), and the oil baffle chamber (S) comprises a first outflow (S1) and a second outflow (S2), the first and second outflows (S1) arranged such that a first oil flow (F1) to the first bearing (L1) starts from the first outflow (S1) and a second oil flow (F2) to the second bearing (L2, L2x) starts from the second outflow (S2).

2. The drive train unit (HY, G) of claim 1, further comprising a hydraulically actuated multi-disk clutch (K0), wherein the first oil flow (F1) is further arranged for supplying oil to a pressure compensating cavity (K0B) of the multi-disk clutch (K0).

3. The drive train unit (HY, G) of claim 2, wherein the third shaft (AN) and the second shaft (PW) is connectable to the third shaft (AN) and the second shaft (PW) via the multi-disk clutch (K0).

4. The drive train unit (HY, G) of claim 1, further comprising an extension (TW1) arranged at one axial end of the first shaft (TW), the extension (TW1) configured such that lube oil emerging from the bore hole (B1) is guided along an inner surface of the extension (TW1) to the oil baffle chamber (S).

5. The drive train unit (HY, G) of claim 4, wherein an axial end of the extension (TW1) is arranged axially between the first outflow (S1) and the second outflow (S2) of the oil baffle chamber (S).

6. The drive train unit (HY, G) of claim 4, wherein the first bearing (L1) is disposed at an outer circumference of the extension (TW1).

7. The drive train unit (HY, G) of claim 1, further comprising a covering element (PW1) with at least one passage opening (PW1A), wherein the covering element (PW1) is disposed at an axial end of the second shaft (PW), and the passage opening (PW1) is configured for limiting a flow rate of the second oil flow (F2).

8. The drive train unit (HY, G) of claim 1, further comprising a hydrodynamic torque converter (TC) with an impeller (PR) and a turbine wheel (TR), wherein the first shaft (TW) is connected to the turbine wheel (TR), and the second shaft (PW) is connected to the impeller (PR).

9. The drive train unit (HY, G) of claim 1, wherein the drive train unit is formed by a transmission (G).

10. The drive train unit (HY, G) of claim 1, wherein the drive train unit is formed by a hybrid module (HY) arranged between an internal combustion engine (VM) and a transmission.

11. A drive train for a motor vehicle, comprising the drive train unit (HY, G) of claim 1.

* * * * *